(12) United States Patent
McLean et al.

(10) Patent No.: US 11,296,905 B2
(45) Date of Patent: Apr. 5, 2022

(54) MANAGEMENT COMPONENT TRANSPORT PROTOCOL (MCTP) SUPPORT FOR MULTIPLE BUS SEGMENT GROUPS

(71) Applicant: ATI TECHNOLOGIES ULC, Markham (CA)

(72) Inventors: Michael McLean, Markham (CA); Philip Ng, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/219,149

(22) Filed: Dec. 13, 2018

(65) Prior Publication Data

US 2020/0195469 A1 Jun. 18, 2020

(51) Int. Cl.
| | |
|---|---|
| *H04L 12/40* | (2006.01) |
| *G06F 13/40* | (2006.01) |
| *H04L 45/745* | (2022.01) |
| *H04L 45/00* | (2022.01) |

(52) U.S. Cl.
CPC ...... *H04L 12/40091* (2013.01); *G06F 13/404* (2013.01); *H04L 45/22* (2013.01); *H04L 45/745* (2013.01)

(58) Field of Classification Search
CPC . H04L 12/40091; H04L 45/745; H04L 45/22; H04L 45/74; H04L 61/35; H04L 61/10; G06F 13/404; G06F 13/4022; G06F 13/4027; G06F 13/385; G06F 12/02; G06F 13/4282; G06F 2213/0026; G06F 13/4004
See application file for complete search history.

(56) References Cited

U.S. PATENT DOCUMENTS

| | | | | |
|---|---|---|---|---|
| 2009/0083760 | A1* | 3/2009 | Slaight | G06F 13/4022 719/313 |
| 2012/0047309 | A1* | 2/2012 | Natu | H04L 63/101 710/314 |
| 2012/0066430 | A1* | 3/2012 | Cooper | G06F 13/4022 710/316 |
| 2013/0346666 | A1* | 12/2013 | Chang | G06F 13/20 710/313 |
| 2014/0281070 | A1* | 9/2014 | Natu | G06F 13/385 710/105 |
| 2014/0372660 | A1* | 12/2014 | Jones | G06F 13/4022 710/316 |

OTHER PUBLICATIONS

"Management Component Transport Protocol (MCTP) Base Specification", DMTF, Version 1.3.0, Nov. 24, 2016, 94 pages.

(Continued)

*Primary Examiner* — Michael K Phillips (57) ABSTRACT

A Management Component Transport Protocol platform management subsystem includes an internal bridge, a first segment group, and a second segment group. The first segment group is coupled to the internal bridge. The second segment group is coupled to the internal bridge and the first segment group. The first segment group has a first plurality of Peripheral Component Interconnect Express (PCIe)-based buses. The second segment group has a second plurality of PCIe-based buses, wherein based on an identification (ID)-routed packet from the first segment group to the second segment group, the internal bridge routes the ID-routed packet to the second segment group.

25 Claims, 4 Drawing Sheets

(56) References Cited

OTHER PUBLICATIONS

"Management Component Transport Protocol (MCTP) PCIe VDM Transport Binding Specification", DMTF, Version 1.0.2, Dec. 7, 2014, 19 pages.
"PCI Express® Base Specification Revision 3.0", PCI-SIG, Nov. 10, 2010, 860 pages.

* cited by examiner

| ENTRY NUMBER 304 | TARGET EID 310 | TARGET ENDPOINT ACCESS PORT 320 | TARGET EID ACCESS PHYSICAL ADDRESS 330 | DEVICE TYPE/ENTRY TYPE 340 |
|---|---|---|---|---|
| 1 | EID 1 | P1 | SEG1,BUS4/DEV1/FN0 | BUS OWNER |
| 2 | EID 2 | P1 | SEG1,BUS0/DEV0/FN0 | BRIDGE, SELF |
| 3 | EID 2 | P2 | SEG1,BUS0/DEV0/FN0 | BRIDGE, SELF |
| 4 | EID 2 | P3 | SEG2,BUS0/DEV0/FN0 | BRIDGE, SELF |
| 5 | EID 2 | P4 | SEG3,BUS0/DEV0/FN0 | BRIDGE, SELF |
| 6 | EID 10 | P2 | SEG1,BUS5/DEV1/FN0 | ENDPOINT |
| 7 | EID 11 | P2 | SEG1,BUS6/DEV1/FN0 | ENDPOINT |
| 8 | EID 12 | P2 | SEG1,BUS7/DEV1/FN0 | ENDPOINT |
| 9 | EID 20 | P3 | SEG2,BUS5/DEV1/FN0 | ENDPOINT |
| 10 | EID 21 | P3 | SEG2,BUS6/DEV1/FN0 | ENDPOINT |
| 11 | EID 22 | P3 | SEG2,BUS7/DEV1/FN0 | ENDPOINT |
| 12 | EID 30 | P4 | SEG3,BUS5/DEV1/FN0 | ENDPOINT |
| 13 | EID 31 | P4 | SEG3,BUS6/DEV1/FN0 | ENDPOINT |
| 14 | EID 32 | P4 | SEG3,BUS7/DEV1/FN0 | ENDPOINT |

FIG. 4

MANAGEMENT COMPONENT TRANSPORT PROTOCOL (MCTP) SUPPORT FOR MULTIPLE BUS SEGMENT GROUPS

BACKGROUND

Management Component Transport Protocol (MCTP) is a transport independent protocol that is used for intercommunication within an MCTP network. MCTP protocol supports communications amongst various intelligent devices in the MCTP network and allows for uniform communication with other intelligent devices using, for example, Peripheral Component Interconnect Express (PCI Express or PCIe). PCI Express is a high-speed serial computer expansion bus standard that is used extensively in server systems. An MCTP network may expand over a combination of interfaces such as, for example, PCIe, System Management Bus (SMBus), and Network Controller Sideband Interface (NC-SI). The portion of the MCTP protocol that overlays onto a PCIe fabric is called MCTP-over-PCIe.

Many larger server systems that utilize MCTP-over-PCIe, however, only allow intercommunication via a single PCI Segment Group, which is limited to two-hundred and fifty-six buses when using the PCI Express protocol. Thus, a need exists to increase the number of PCI Segment Groups in an MCTP network to allow for communication amongst a greater number of buses.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and techniques for supporting Management Control Protocol (MCTP)-over-PCIe in a system with multiple PCI Segment Groups. MCTP is a transport independent protocol that is used for the intercommunication of multiple devices in a platform management subsystem of an MCTP network. Access to devices in a platform management subsystem may include the use of interconnect communication protocol/s described in industry standards or specifications (including progenies or variants) such as, for example, the Peripheral Component Interconnect Express (hereinafter, PCI Express or PCIe). MCTP also provides support for standard interconnect protocols, such as, the System Management Bus, Inter-Integrated Circuit ($I^2C$) and Universal Serial Bus (USB). Thus, a single MCTP network may span multiple bus protocols including, for example, PCIe.

A typical MCTP-over-PCIe system is constructed using a single PCI segment group that is limited to two-hundred and fifty-six buses, which restricts the number of PCIe endpoints that can be connected to the MCTP-over-PCIe system. That is, MCTP-over-PCIe is designed to operate within a single segment group and relies on the use of PCIe Vendor Defined Messages, which can only provide communication within the single PCIe segment group. In order to expand an MCTP-over-PCIe system beyond a single segment group and maintain support for MCTP-over-PCIe, the platform management subsystem described herein improves upon the existing MCTP protocol by providing a method for facilitating MCTP-over-PCIe communication between multiple segment groups.

Figure 1:
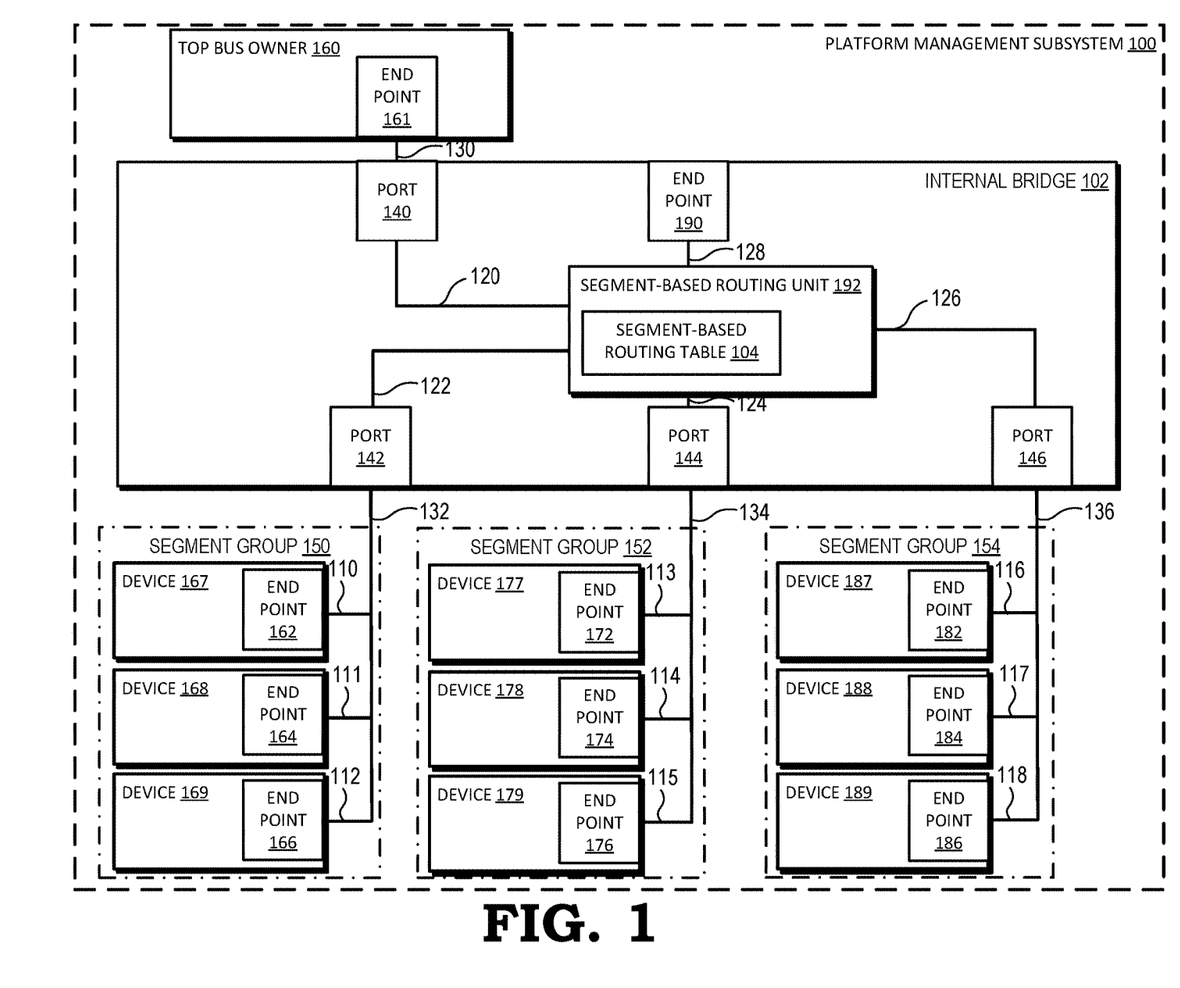
FIG. 1 is a block diagram of a platform management subsystem that supports MCTP-over-PCIe communication between multiple PCI Segment Groups in accordance with some embodiments.

FIG. 1 illustrates a platform management subsystem 100 implementing MCTP-over-PCIe in a system with multiple PCI segment groups in accordance with various embodiments. In various embodiments, platform management subsystem 100 encompasses a computer system. In various embodiments, platform management subsystem 100 may be, for example, part of a desktop, workstation, mobile, server, or other computing device that uses the MCTP-over-PCIe standards. The various devices interconnected to platform management subsystem 100 communicate using an MCTP-over-PCIe protocols.

Platform management subsystem 100 includes an internal bridge 102 that is coupled to a segment group 150, a segment group 152, and a segment group 154 (hereinafter, segment groups 150-154) via a bus segment 132, a bus segment 134, and a bus segment 136, respectively. In addition, internal bridge 102 is coupled to a top bus owner 160 (or device 160) via bus segment 130. Internal bridge 102 includes a segment-based routing unit 192 that is coupled to a port 140, a port 142, a port 144, a port 146 (hereinafter, ports 140-146), and an endpoint 190, via a bus 120, a bus 122, a bus 124, a bus 126, and a bus 128, respectively. Ports 140-146 are coupled to top bus owner 160, segment group 150, segment group 152, and segment group 154, via bus segment 130, bus segment 132, bus segment 134, and bus segment 136, respectively.

Segment groups 150-152 include a plurality of devices that can intercommunicate using MCTP-over-PCIe protocol. Segment group 150 includes a device 167, a device 168, and a device 169 (hereinafter, devices 167-169) coupled to bus segment 132 via a bus 110, a bus 111, and a bus 112, respectively. Segment group 152 includes a device 177, a device 178, a device 179 (hereinafter, devices 177-179) coupled to bus segment 134 via a bus 113, a bus 114, and a bus 115, respectively. Segment group 154 includes a device 187, a device 188, and a device 189 (hereinafter, devices 187-189) coupled to bus segment 136 via to a bus 116, a bus 117, and a bus 118, respectively. Devices 167-169 include an endpoint 162, an endpoint 164, and an endpoint 166. Devices 177-179 include an endpoint 172, an endpoint 174, and an endpoint 176. Devices 187-189 include an endpoint 182, an endpoint 184, and an endpoint 186.

Devices 167-169, devices 177-179, and devices 187-189 in platform management subsystem 100 are physical devices that are a part of each segment group of segment groups 150-154, respectively. Under MCTP-over-PCIe protocols, each device is either a management controller and/or a managed device. A management controller is a microcontroller or processor that aggregates parameters from one or more managed devices and makes access to those parameters available to local or remote software, or to other management controllers. A managed device is a device that is implemented using, for example, a microcontroller and accessed through a messaging protocol and is used for accessing one or more management parameters. A managed device responds to management requests or communication requests but does not initiate or aggregate management operations except in conjunction with a management controller. A managed device may be considered a satellite device that is subsidiary to one or more management controllers. Both management controllers and managed devices are considered endpoints of platform management subsystem 100.

Endpoints 162-166, endpoints 172-176, endpoints 182-186, and endpoint 190 of platform management subsystem 100 are considered the terminus or the origin of MCTP packets or PCIe VDM messages (VDMs) that are used for intercommunication between the MCTP-over-PCIe physical devices. An MCTP or MCTP-over-PCIe packet is the unit of data transfer used for communication on a given device associated with platform management subsystem 100. PCIe VDM messages or simply VDMs are user-defined packets that exist within PCIe. MCTP defines a usage of the VDM packets to transport MCTP protocol packets across PCIe. In various embodiments, each physical device from devices 167-169, devices 177-179, and devices 187-189 may provide one or more MCTP endpoints as defined under PCIe standards for which PCIe VDM communication is supported.

Platform management subsystem 100 uses endpoint identifiers (EIDs) to identify MCTP endpoints. EIDs are the system-wide unique IDs used by platform management subsystem 100 to address endpoints and for routing messages across multiple PCI buses in the system. The device addressed by a request has an EID and a PCIe bus number, device number, and function number that can uniquely identify the device. The EID and the PCIe Bus/Device/Function (BDF) are separate values. The EID is an 8-bit number that is common across the entire MCTP network (i.e., across SMBus, PCIe, etc.). Each PCIe device that supports MCTP-over-PCIe has both an EID and a BDF. When an MCTP-over-PCIe endpoint seeks to communicate with another endpoint, the MCTP-over-PCIe endpoint must discover both the target EID and BDF, which is then considered the endpoint's corresponding target BDF. Under the MCTP protocol, the BDF is considered a physical address in the context of PCIe, where PCIe routes the actual VDM/MCTP packets using the BDF. Thus, EIDs are numeric handles that uniquely identify a particular MCTP endpoint, such as, for example, each endpoint of endpoints 162-166, endpoints 172-176, and endpoints 182-186. Endpoints 162-166, endpoints 172-176, and endpoints 182-186 are addressed using the logical address. EIDs may be statically or dynamically allocated by the MCTP bus owner. In various embodiments, for example, top bus owner 160 (which is also an endpoint having its own associated EID) or bus owners located in, for example, segment group 150, segment group 152, or segment group 154 may allocate EIDs. In various embodiments, BDFs are assigned by software running on, for example, the CPU, system Basic Input/Output System (BIOS), hypervisor, or operating system.

In alternate embodiments, devices 167, 177, and 187 may be bus owners that serve as a bridge between a local segment and a main segment (not shown). In various embodiments, devices 167, 177, and 187 are MCTP-over-PCIe devices (e.g., microcontrollers) that are responsible for issuing EIDs to, for example, devices 168, 169, 178, 179, 188, 189, on a bus segment. The EIDs come from a pool of EIDs provided by top bus owner 160. Top bus owner 160 is an MCTP-over-PCIe device responsible for supporting device discovery of other devices, such as devices 167-169, devices 177-179, and devices 187-189. Topmost bus owner 160 is the ultimate source of the EID pool from which all EIDs are drawn. Topmost bus owner 160 distributes EIDs to bus owner devices 167, 177, 187 for allocation to other satellite devices located in the segment group when, for example, the MCTP-over-PCIe network uses EIDs that are dynamically allocated. In various embodiments, topmost bus owner 160 is the only device in platform management subsystem 100 that requires a static EID assignment. Topmost bus owner 160 requires a static EID because there is no other party to assign it an EID through MCTP-over-PCIe. In some embodiments, top bus owner 160 also provides a mechanism for endpoints 162-166, endpoints 172-176, and endpoints 182-186 to resolve an EID into the physical address used that is required to deliver a message to a target endpoint.

Busses are used in platform management subsystem 100 to move packets or VDMs across the MCTP-over-PCIe platform management subsystem 100. Under the MCTP-over-PCIe protocols, a bus is defined as a physical medium that shares a single physical address space. A bus segment is a series of buses that are interconnected to various devices, segment groups, or other busses. In various embodiments, bus segments 130, 132, 134, and 136 of platform management subsystem 100 are used to move packets to and from internal bridge 102 to, for example, top most bus owner 160, segment group 150, segment group 152, and segment group 154. In various embodiments, busses 110-118 and bus segments 130-136, individually or as a whole, may be PCIe busses that adhere to PCIe standards and include the interconnects between PCIe compliant devices. In various embodiments, busses 110-118 and bus segments 130-136, individually or as a whole, may be SMBus and/or USB busses that adhere to SMB or USB standards and include the interconnects between SMB or USB compliant devices. Bus 122, bus 120, and bus 124 are buses that are able to communicate across multiple PCI segment groups, unlike the standard MCTP-over-PCIe protocol.

Segment groups 150-154 (and similarly segment groups 250-254 with reference to FIG. 2 below) are groups of devices with associated EIDs that make up part of the MCTP-over-PCIe network. Segment groups 150-154 are coupled to internal bridge 102 via busses 132, 134, and 136, respectively. As stated previously, devices in each segment group may include management controllers and/or managed devices which may be, for example, bus owners of the segment group. Topmost bus owner 160 of platform management subsystem 100 controls the distribution of EIDs to the bus owners of each segment group. The EID numbering system of each segment group maps to the numbering system of other segment groups, because a segment group is mandated to a specific hierarchy under MCTP-over-PCIe protocol requirements. The entire bus architecture, which includes, for example, busses 110-118 and busses 132-136, communicate directly with internal bridge 102 via ports 142-146. That is, internal bridge 102 has a single port for each bus segment 132, 134, and 136. Setting up platform management subsystem 100 with, for example, multiple segment groups 150-154 allows the limit of busses normally mandated under a single segment group MCTP-over-PCIe protocol to be bypassed and the distribution of packets to multiple segment groups deemed appropriate under current MCTP-over-PCIe standards.

In order to bypass the MCTP-over-PCIe bus limitations, internal bridge 102 uses segment-based routing unit 192 to facilitate routing MCTP requests between multiple PCI segment groups in a platform subsystem. Unlike typical bridges in single-segment group MCTP-over-PCIe systems, internal bridge 102 is able to route messages between multiple segment groups using segment-based routing unit 192 and a segment-based routing table 104. In order to facilitate the routing of VDMs to multiple segment groups, segment-based routing unit 192 maintains segment-based routing table 104 where, in addition to each entry in the table associating a single EID or a range of EIDs with a single physical address and bus ID for devices that are on buses that are directly connected to internal bridge 102, segment-based routing unit 192 associates either a single segment group or multiple segment groups with a single physical address and bus ID for segment groups that are directly connected or coupled to internal bridge 102. This allows segment-based routing unit 192 of internal bridge 102 to transform a single segment group MCTP-over-PCIe system into a multiple segment group MCTP-over-PCIe system. That is, in addition to handling the task of managing the movement of packets from one type of physical media to another, such as moving an MCTP packet between SMBus/I2C and PCIe Vendor Defined Messaging (VDM) types, internal bridge 102 allows for communication between two or more PCIe segment groups, such as, for example, segment group 150, segment group 152, and segment group 154. Because typical MCTP-over-PCIe VDMs (in addition to broadcast and route-to-root) do not support ID-routing between segment groups, platform management subsystem 100 is an improvement over the standard MCTP-over-PCIe protocol.

During operation of platform management subsystem 100, an endpoint (hereinafter, a requesting endpoint) of the endpoints 162-164 located in segment group 150 issues a communication request for communication with a target endpoint of endpoints 172-174 of segment group 152 or endpoints 182-186 of segment group 154. In various embodiments, the target endpoint requested by the requesting endpoint may be located internal or external to the segment group from which the requesting endpoint is located. For example, the target endpoint requested by the requesting endpoint may be located internal or external to segment groups 150-154. In various embodiments, the requesting endpoint makes requests to internal bridge 102 (described further below) using the internal bridge's BDF, but the target endpoint's EID. In various embodiments, the communication request contains the PCIe BDF of internal bridge 102, but the MCTP EID of the target. This allows internal bridge 102 to change or modify the BDF to be the BDF that matches the target in the target segment group, where the modification is based on an assumption that there is a direct connection to the target segment group and not a path through a separate bridge.

Internal bridge 102 forwards the communication request using segment-based routing unit 192. The requesting endpoint operates under the assumption that the platform management subsystem 100 is operating using a single-segment group MCTP-over-PCIe protocol. The communication request is in the form of a VDM message and is relayed through platform management subsystem 100 using one or more MCTP packets. In various embodiments, platform management subsystem 100 may use an MCTP control message or a PCIe VDM message. MCTP control messages are messages that are used to support initialization and configuration of MCTP communication within platform management subsystem 100. As stated previously, PCIe VDM messages are messages used to support VDMs where the vendor is identified using a PCIe-based vendor ID. For purposes of the embodiment shown in FIG. 1, the communication request is referred to as a VDM message or VDM.

Segment-based routing unit 192 of internal bridge 102 receives the VDM via bus 122 and compares the target endpoint identification (target endpoint ID) of the requested target endpoint to a list of target endpoint IDs in segment-based routing table 104. In addition to a list of target endpoint IDs, segment-based routing table 104 includes a list of associated target endpoint access ports, physical addresses for target endpoint access, and device types associated with the target endpoint. Unlike traditional single-segmented group MCTP-over-PCIe platform management subsystems, in addition to bus ID, device ID, and the function ID, target-endpoint access physical address includes the segment group ID associated with the target endpoint ID. When segment-based routing unit 192 determines that the VDM target endpoint ID matches with target endpoint ID associated with internal bridge 102 in segment-based routing table 104, internal bridge 102 consumes the VDM.

When segment-based routing unit 192 determines there is a match with a target endpoint entry in segment-based routing table 104 that is not associated with segment group 150, internal bridge 102 changes the physical addresses in the VDM and reformats the medium specific header and trailer fields to match the destination bus segment.

Segment-based routing unit 192 then routes the VDM sent by the requesting endpoint to the target endpoint through the corresponding selected internal bridge target port (port 144 or port 146) via bus 126 or bus 124, without the requesting endpoint ever knowing that internal bridge 102 has utilized a multi-segmented group platform management subsystem 100. Thus, segment-based routing unit 192 has routed MCTP requests between multiple PCI segment groups and the requesting endpoint is unaware that multiple segment groups have been utilized in platform management subsystem 100.

Figure 2:
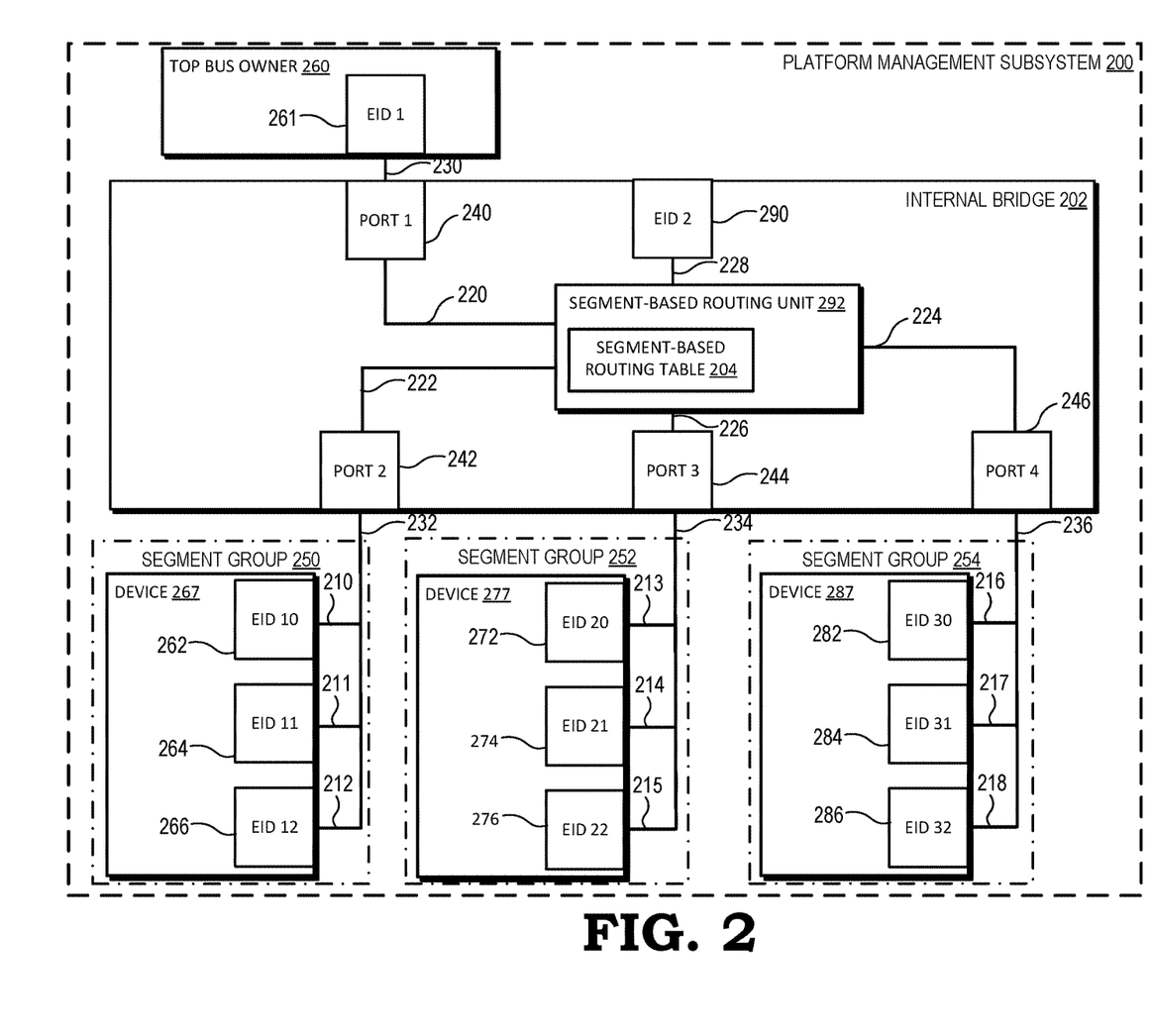
FIG. 2 is a block diagram of a platform management subsystem implementing MCTP-over-PCIe communication between multiple PCI Segment Groups in accordance with some embodiments.
Figure 3:
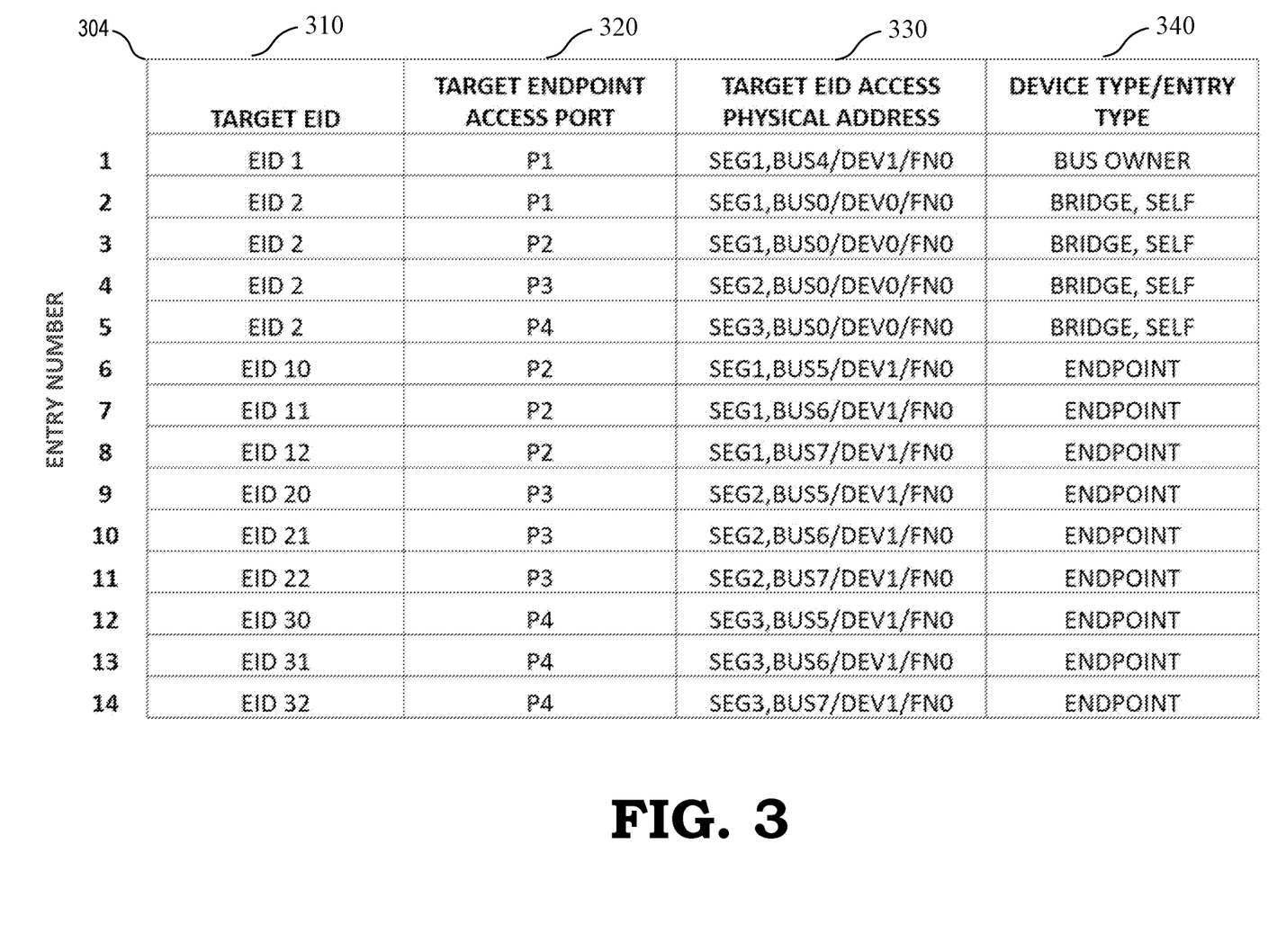
FIG. 3 is a segment-based routing table used in a process of routing MCTP requests between multiple PCI Segment Groups in a platform management subsystem in accordance with some embodiments.

FIG. 2 is a block diagram of a platform management subsystem 200 in accordance with some embodiments. Platform management subsystem 200 depicts an example of MCTP-over-PCIe communication between multiple PCI segment groups that include a single device per segment group with three endpoints per device. FIG. 3 references the example in FIG. 2 and illustrates a table that reflects the routing of MCTP requests between multiple PCI segment groups that is occurring in FIG. 2.

Platform management subsystem 200 includes an internal bridge 202, a segment group 250, a segment group 252, a segment group 254, a bus segment 230, a bus segment 232, a bus segment 234, a bus segment 236, and a top bus owner 260. Top bus owner 260 is coupled to internal bridge 202 via bus segment 230. Internal bridge 202 is coupled to segment group 250, segment group 252, segment group 254 via bus segment 232, bus segment 234, and bus segment 236, respectively. Internal bridge 202 includes a port 240, a port 242, a port 244, a port 246, an endpoint 290, a bus 220, a bus 222, a bus 224, and a segment-based routing unit 292. Segment-based routing unit 290 is coupled to port 240, port 242, port 244, port 246, and EID 290 via bus 220, bus 222, bus 226, bus 224, and bus 228, respectively.

Segment group 250 includes a device 267, a bus 210, a bus 211, and a bus 212. Device 267 includes an endpoint 262, an endpoint 264, and an endpoint 266. Device 267 is coupled to bus segment 232 via bus 210, bus 211, and bus 212 at endpoint 262, endpoint 264, and endpoint 266, respectively. Segment group 252 includes a device 277, a bus 213, a bus 214, and a bus 215. Device 277 is coupled to bus segment 234 via bus 213, bus 214, and bus 215 at endpoint 272, endpoint 274, and endpoint 276, respectively. Segment group 254 includes a device 287, a bus 216, a bus 217, and a bus 218. Device 287 is coupled to bus segment 236 via bus 216, bus 217, and bus 218 at endpoint 282, endpoint 274, and endpoint 276, respectively. In various embodiments, busses 210-218 and bus segments 230-236, individually or as a whole, may be PCIe busses and PCIe bus segments that adhere to PCIe standards and include the interconnects between PCIe compliant devices. In various embodiments, busses 210-218 and bus segments 230-236, individually or as a whole, may be SMBus and/or USB busses that adhere to SMB or USB standards and include the interconnects between SMB or USB compliant devices.

During operation, platform manage system 200 assumes that internal bridge 202 has a single EID and receives its EID assignment and EID allocation from top bus owner 260. As stated previously, an EID includes the entire logical device address that is utilized on the bus the device is coupled to. Under the PCI Express standard, the logical device addressed by a request has an EID that is a combination of a bus number, device number, and function number that can uniquely identify the logical device. In addition, for platform management subsystem 200, a bus segment number is also included in the EID to identify which bus segment the device is located in, since within each segment, the connected devices will utilize similar bus numbers, device numbers, and function numbers in order to meet the MCTP-over-PCIe protocol requirements.

For the example shown in FIG. 2 and referenced in FIG. 3, top bus owner 260 has assigned endpoint 261 with EID 1 and endpoint 290 with EID 2 and has allocated EIDs 10-12, 20-22, and 30-32 for distribution by internal bridge 202. EID 1 has a bus segment number of 1, a bus number of 4, a device number of 1, and a function number of 0. EID 2 has a bus segment number of 0, a bus number of 4, a device number of 0, and a function number of 0. In various embodiments, bus owners associated with each segment group 250, segment group 252, and segment group 254 may distribute the allocated EIDs.

Internal bridge 202 has assigned endpoint 262, endpoint 264, and endpoint 266, of device 267 with EID 10, EDI 11, and EID 12, respectively. EID 10 has a bus segment number of 1, a bus number of 5, a device number of 1, and a function number of 0. EID 11 has a bus segment number of 1, a bus number of 6, a device number of 1, and a function number of 0. EID 12 has a bus segment number of 1, a bus number of 7, a device number of 1, and a function number of 0.

Similarly, internal bridge 202 has assigned endpoint 272, endpoint 274, endpoint 276, of device 277 with EID 20, EDI 21, and EID 22, respectively. EID 20 has a bus segment number of 2, a bus number of 5, a device number of 1, and a function number of 0. EID 21 has a bus segment number of 2, a bus number of 6, a device number of 1, and a function number of 0. EID 22 has a bus segment number of 2, a bus number of 7, a device number of 1, and a function number of 0.

In addition, internal bridge 202 has assigned endpoint 282, endpoint 284, endpoint 286, of device 287 with EID 30, EDI 31, and EID 32, respectively. EID 30 has a bus segment number of 3, a bus number of 5, a device number of 1, and a function number of 0. EID 31 has a bus segment number of 3, a bus number of 6, a device number of 1, and a function number of 0. EID 32 has a bus segment number of 3, a bus number of 7, a device number of 1, and a function number of 0.

After internal bridge 202 assigns each endpoint with its appropriate EID, internal bridge 202 receives a VDM originating from endpoint 262 targeting EID 282. Segment-based routing unit 292 determines whether target EID in the VDM packet matches the range of EIDs in routing table 204. When the EID is targeted for internal bridge 202 itself, internal bridge 202 consumes the VDM. When segment-based routing unit 292 determines there is a match with an entry in routing table 204, internal bridge 202 changes the physical addresses in the VDM and reformats the medium specific header and trailer fields to target bus segment 236 associated with segment group 254 (the target bus segment and target segment group).

Internal bridge 202 replaces the destination address from the source bus with the destination physical address for the destination bus obtained from the entry in routing table 204. Internal bridge 200 replaces the source physical address in the packet it received with the physical address of internal bridge 200 on the target bus, which is necessary to enable messages to be routed back to the originator. Packet-specific transport header and data integrity fields are updated as required by the particular transport binding, in this case, PCIe VDM. When there is not a match, packets with EID values that are not in routing table 204 are discarded.

FIG. 3 is an illustration of a segment-based routing table 304 that is used for routing MCTP requests between multiple PCI segment groups in a platform management subsystem. In various embodiments, segment-based routing table 304 includes a target endpoint ID 310, a target endpoint access port 320, a target endpoint access physical address 330, and a device type 340. Target endpoint ID 310 is the identification ID of the target device provided by the VDM that is being requested by the requesting endpoint in the VDM.

With reference to FIGS. 2 and 3, segment-based routing unit 292 maintains segment-based routing table 302 where each entry in the table associates either a single EID or a range of EIDs with a single physical address and bus ID for devices that are on buses or bus segments that are directly connected to, for example, internal bridge 202. For platform management subsystem 200 referenced by segment-based routing table 304, in addition to a bus number, a device number, and a function number, the physical address format includes a bus segment number.

The first entry, entry 1, is created and populated by top most bus owner 260 initializing with segment 1, bus 4, device 1, and function 0, i.e., Seg1, Bus4/Dev1/Fn0. The next four entries, entries 2-5, are created and populated by internal bridge 202 (i.e., self) upon receiving initial EID assignment from topmost bus owner 260. Entry 2 is populated with Seg1, Bus0/Dev0/Fn0. Entry 3 is populated with Seg1, Bus0/Dev0/Fn0. Entry 4 is populated with Seg2, Bus0/Dev0/Fn0. Entry 5 is populated with Seg3, Bus0/Dev0/Fn0.

Entries 6-8 are entries from EIDs 10-11 associated with segment 1, device 1. Entry 6 is created and populated by EID 10 and includes Seg1, Bus5/Dev1/Fn0 which maps to segment 1, bus 5, device 1, and function 0 and target endpoint access port 2. Entry 7 is created and populated by EID 11 and includes Seg1, Bus6/Dev1/Fn0 which maps to segment 1, bus 6, device 1, and function 0 and target endpoint access port 2. Entry 8 is created and populated by EID 12 and includes Seg1, Bus7/Dev1/Fn0 which maps to segment 1, bus 7, device 1, and function 0 and target endpoint access port 2.

Entries 9-11 are entries from EIDs 20-22 associated with segment 2, device 1. Entry 9 is created and populated by EID 20 and includes Seg2, Bus5/Dev1/Fn0 which maps to segment 2, bus 5, device 1, and function 0 and target endpoint access port 3. Entry 10 is created and populated by EID 21 and includes Seg2, Bus6/Dev1/Fn0 which maps to segment 2, bus 6, device 1, and function 0 and target endpoint access port 3. Entry 11 is created and populated by EID 22 and includes Seg2, Bus7/Dev1/Fn0 which maps to segment 2, bus 7, device 1, and function 0 and target endpoint access port 3.

Entries 12-14 are entries from EIDs 30-32 associated with segment 3, device 1. Entry 12 is created and populated by EID 30 and includes Seg3, Bus5/Dev1/Fn0 which maps to segment 3, bus 5, device 1, and function 0 and target endpoint access port 4. Entry 13 is created and populated by EID 31 and includes Seg3, Bus6/Dev1/Fn0, which maps to segment 3, bus 6, device 1, and function 0 and target endpoint access port 4. Entry 14 is created and populated by EID 32 and includes Seg3, Bus7/Dev1/Fn0 which maps to segment 3, bus 7, device 1, and function 0 and target endpoint access port 3.

As stated previously, when segment-based routing unit 292 receives a VDM, it compares the target endpoint ID provided in the VDM to the generated segment-based routing table 304, and when there is a match, performs the procedures described above with reference to FIG. 2 to provide the VDM to the appropriate endpoint in the appropriate segment group. That is, when segment-based routing unit 292 determines there is a match with an entry in segment-based routing table 304, internal bridge 202 changes the physical addresses in the VDM and reformats the medium specific header and trailer fields for the appropriated destination bus segment. Internal bridge 202 replaces the destination address from the source bus with the destination physical address for the destination bus obtained from the entry in routing table 204. Internal bridge 202 replaces the source physical address in the packet it received with the physical address of internal bridge 202 on the target bus, which is necessary to enable messages to be routed back to the originator.

Figure 4:
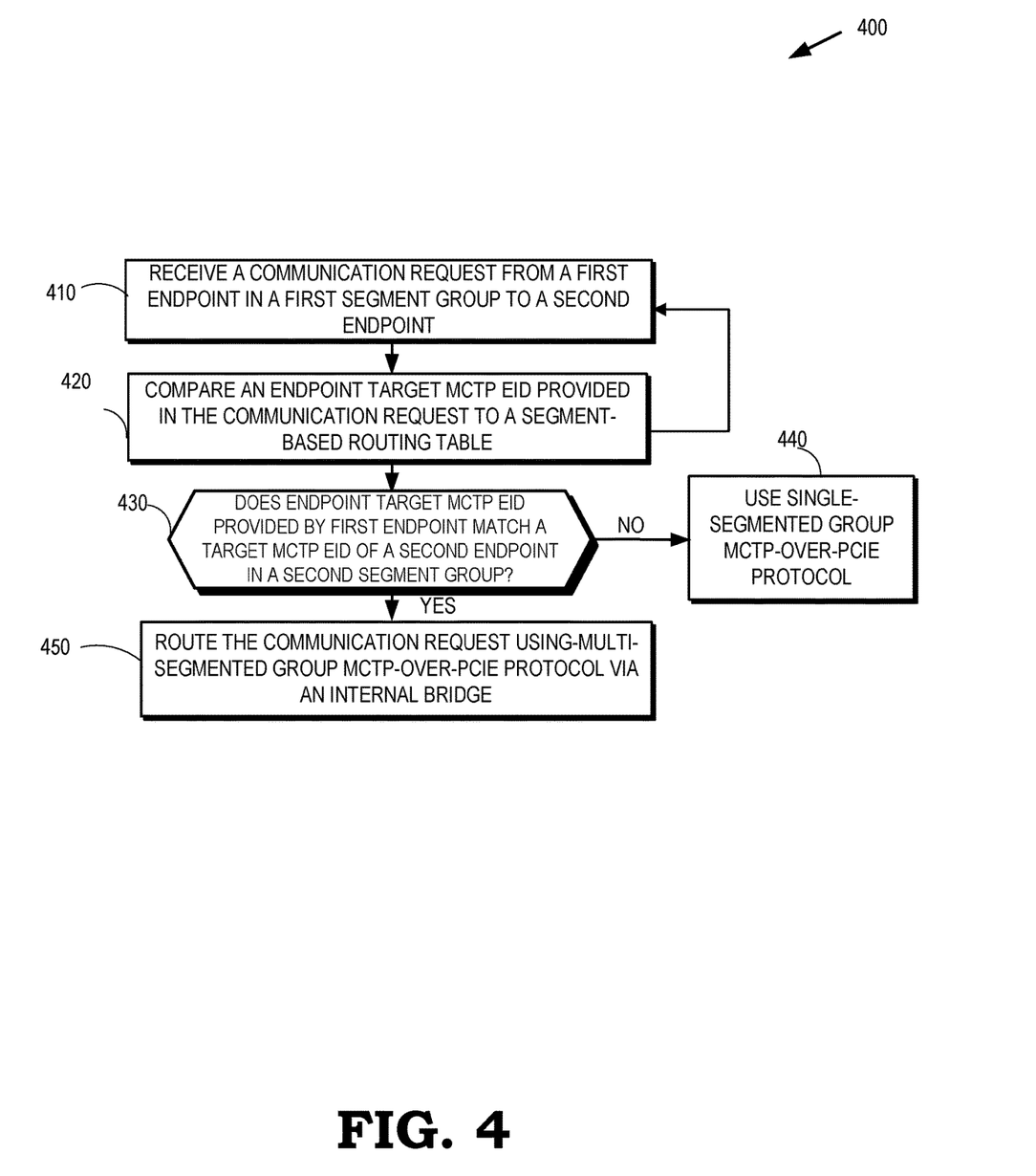
FIG. 4 is a flow diagram illustrating a method for routing MCTP requests between multiple PCI Segment Groups in a platform management subsystem in accordance with some embodiments.

FIG. 4 is a flow diagram illustrating a method 400 for routing MCTP requests between multiple PCI segment groups in accordance with some embodiments. The method 400 is implemented in some embodiments of platform management subsystem 200 shown in FIGS. 2 and 3.

In various embodiments, the method flow begins with block 410. At block 410, internal bridge 202 receives a communication request, e.g., an ID-routed VDM, from a first endpoint in a first segment group to communicate with a second endpoint. In various embodiments, the first segment group has a first plurality of PCIe-based buses, where a PCIe-based bus is a bus that derives from or entails portions of the PCIe-standard. At block 420, segment-based routing unit 292 of internal bridge 202 compares the target MCTP EID provided in the communication request to target MCTP EIDs in segment-based routing table 204.

At block 430, segment-based routing unit 292 of internal bridge 202 determines whether there is a match between the target MCTP EID provided by the first endpoint and the target EID of the second endpoint in a second segment group.

At block 440, when there is not a match, platform management subsystem 200 uses a single-segmented group protocol. At block 450, when there is a match, the communication request is routed by internal bridge 202 using multi-segmented group MCTP-over-PCIe protocol.

In various embodiments, a Management Component Transport Protocol (MCTP) platform management subsystem includes an internal bridge, a first segment group coupled to the internal bridge, the first segment group having a first plurality of PCIe-based buses, and a second segment group coupled to the internal bridge and the first segment group, the second segment group having a second plurality of PCIe-based buses. Based on an ID-routed packet from the first segment group to the second segment group, the internal bridge routes the ID-routed packet to the second segment group.

In various embodiments, the MCTP platform management subsystem further includes a segment-based routing unit located within the internal bridge, wherein the segment-based routing unit routes the ID-routed packet to a second endpoint based on a comparison of a target MCTP endpoint ID provided by a first endpoint to a list of a plurality of target MCTP endpoint IDs located in the segment-based routing unit.

In various embodiments, the MCTP platform management subsystem further includes a segment-based routing table located within the segment-based routing unit. The segment-based routing table includes the list of the plurality of target MCTP endpoint IDs, a plurality of target endpoint access ports, a plurality of target endpoint access physical addresses, and a plurality of device types available for routing.

In various embodiments of the MCTP platform management subsystem, the internal bridge routes the ID-routed packet to the second endpoint via an internal bridge target port associated with the second endpoint.

In various embodiments of the MCTP platform management subsystem, the MCTP platform management subsystem is an MCTP-over-Peripheral Component Interconnect Express (PCIe) platform management subsystem.

In various embodiments of the MCTP platform management subsystem, the MCTP platform management subsystem uses a server processor and communication between the internal bridge and the first segment group occurs via a first bus and communication between the internal bridge and the second segment group occurs via a second bus.

In various embodiments of the MCTP platform management subsystem, the ID-routed packet is a request to send a packet of a plurality of packets to the second endpoint.

In various embodiments of the MCTP platform management subsystem, a target endpoint access physical address of the list of the plurality of target endpoint access physical addresses includes a segment ID, a bus ID, a device ID, and a function ID.

In various embodiments, the MCTP platform management subsystem further includes a top-most endpoint coupled to the internal bridge, the top-most endpoint stationed to provide the internal bridge with a plurality of target MCTP endpoint IDs that are available for assignment to the first segment group and the second segment group.

In various embodiments of the MCTP platform management subsystem, the segment-based routing unit modifies the ID-routed packet when routing the ID-routed packet to the second segment group.

In various embodiments, a method includes receiving an ID-routed vendor defined message (VDM) from a first endpoint in a first segment group having a first plurality of PCIe-based buses to a second endpoint in a second segment group having a second plurality of PCIe-based buses. Based on an ID-routed packet and a segment ID, the ID-routed packet is routed to the second endpoint via an internal bridge. In various embodiments, the method further includes routing the ID-routed packet to the second endpoint based on a comparison of a target MCTP endpoint ID provided by the first endpoint to a list of a plurality of target MCTP endpoint IDs located in a segment-based routing unit. In various embodiments of the method, the segment-based routing unit includes a segment-based routing table for routing the ID-routed packet, the segment-based routing table including the list of the plurality of target MCTP endpoint IDs, a plurality of target endpoint access ports, a plurality of target endpoint access physical addresses, and a plurality of device types available for routing. In various embodiments of the method, the internal bridge routes the ID-routed packet to the second endpoint via an internal bridge target port associated with the second endpoint. In various embodiments of the method, the list of the plurality of target endpoint access ports includes at least one of a first port ID, a second port ID, a third port ID, and a fourth port ID. In various embodiments of the method, communication between the internal bridge and the first segment group occurs via a first bus segment and communication between the internal bridge and the second segment group occurs via a second bus segment. In various embodiments of the method, the ID-routed packet is a request to send a packet of a plurality of packets to the second endpoint. In various embodiments, a method includes receiving an ID-routed packet from a first endpoint of a first segment group having a first plurality of PCIe-based buses to a second endpoint of a second segment group having a second plurality of PCIe-based buses, and using an internal bridge to route the ID-routed packet from the first segment group to the second segment group, the internal bridge being configured to operate using a Management Component Transport Protocol (MCTP)-over-Peripheral Component Interconnect Express (PCIe) protocol. In various embodiments, the method further includes comparing a target endpoint ID provided as part of the ID-routed packet with a list of a plurality target endpoint IDs in a segment-based routing table. In various embodiments, the method further includes routing the ID-routed packet to the second segment group using the segment-based routing table.

In some embodiments, the apparatus and techniques described above are implemented in a system including one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A Management Component Transport Protocol (MCTP) platform management subsystem, comprising:
   an internal bridge;
   a first segment group coupled to said internal bridge, said first segment group having a first plurality of Peripheral Component Interconnect Express (PCIe)-based buses; and
   a second segment group coupled to said internal bridge and said first segment group, said second segment group having a second plurality of PCIe-based buses;
   wherein the internal bridge renders a multi-segmented protocol of the internal bridge transparent to a requesting endpoint by adjusting an identifier of said internal bridge associated with a direct connection to said second segment group exclusive of an indirect connection to said second segment group.

2. The MCTP platform management subsystem of claim 1, further comprising:
   a segment-based routing unit located within said internal bridge, wherein said segment-based routing unit routes an identification (ID)-routed packet to a second endpoint based on a comparison of a target MCTP endpoint ID provided by a first endpoint to a list of a plurality of target MCTP endpoint IDs located in said segment-based routing unit.

3. The MCTP platform management subsystem of claim 2, further comprising:
   a segment-based routing table located within said segment-based routing unit, wherein said segment-based routing table includes said list of said plurality of target MCTP endpoint IDs, a plurality of target endpoint access ports, a plurality of target endpoint access physical addresses, and a plurality of device types available for routing.

4. The MCTP platform management subsystem of claim 2, wherein:
   said internal bridge routes an identification (ID)-routed packet to said second endpoint via an internal bridge target port associated with said second endpoint.

5. The MCTP platform management subsystem of claim 3, wherein:
   said MCTP platform management subsystem is an MCTP-over-PCIe platform management subsystem.

6. The MCTP platform management subsystem of claim 4, wherein:
   communication between said internal bridge and said first segment group occurs via a first bus and communication between said internal bridge and said second segment group occurs via a second bus.

7. The MCTP platform management subsystem of claim 4, wherein:
   said ID-routed packet is a request to send a packet of a plurality of packets to said second endpoint.

8. The MCTP platform management subsystem of claim 3, wherein:
   a target endpoint access physical address of said list of said plurality of target endpoint access physical addresses includes a segment ID, a bus ID, a device ID, and a function ID.

9. The MCTP platform management subsystem of claim 1, further comprising:
   a top-most endpoint coupled to said internal bridge, said top-most endpoint stationed to provide said internal bridge with a plurality of target MCTP endpoint IDs that are available for assignment to said first segment group and said second segment group.

10. The MCTP platform management subsystem of claim 4, wherein said segment-based routing unit modifies said ID-routed packet when routing said ID-routed packet to said second segment group.

11. The MCTP platform management subsystem of claim 1, wherein said internal bridge replaces a source physical address in said ID-routed packet with a physical address of the internal bridge in order to enable messages to be routed back to an originator.

12. The MCTP platform management subsystem of claim 3, wherein a target endpoint access physical address of said list of said plurality of target endpoint access physical addresses includes a segment ID, a bus ID, a device ID, and a function ID, the segment ID being used in conjunction with the bus ID, the device ID, and the function ID to route said ID-routed packet to said second segment group.

13. The MCTP platform management subsystem of claim 1, wherein said internal bridge routes an identification (ID)-routed packet to said second segment group.

14. A method, comprising:
   receiving an identification (ID)-routed vendor defined message (VDM) from a first endpoint in a first segment group having a first plurality of Peripheral Component Interconnect Express (PCIe)-based buses to a second endpoint in a second segment group having a second plurality of PCIe-based buses; and
   routing an ID-routed packet to said second endpoint via an internal bridge, the routing of said ID-routed packet including rendering a multi-segmented protocol of the internal bridge transparent to a requesting endpoint by adjusting an identifier of said internal bridge based on a direct connection to said second segment group via said internal bridge and exclusive of an indirect connection to said second segment group via a separate bridge.

15. The method of claim 14, wherein:
   routing said ID-routed packet to said second endpoint includes routing said ID-routed packet based on a comparison of a target MCTP endpoint ID provided by said first endpoint to a list of a plurality of target MCTP endpoint IDs located in a segment-based routing unit.

16. The method of claim 15, wherein:
   said segment-based routing unit includes a segment-based routing table for routing said ID-routed packet, said segment-based routing table including said list of said plurality of target MCTP endpoint IDs, a plurality of target endpoint access ports, a plurality of target endpoint access physical addresses, and a plurality of device types available for routing.

17. The method of claim 14, wherein:
   said internal bridge routes said ID-routed packet to said second endpoint via an internal bridge target port associated with said second endpoint.

18. The method of claim 14, wherein said internal bridge replaces a source physical address in said ID-routed packet with a physical address of the internal bridge in order to enable messages to be routed back to an originator.

19. The method of claim 14, wherein a target endpoint access physical address of a list of a plurality of target endpoint access physical addresses includes a segment ID, a bus ID, a device ID, and a function ID, the segment ID being used in conjunction with the bus ID, the device ID, and the function ID to route said ID-routed packet to said second endpoint.

20. A method, comprising:
   receiving an identification (ID)-routed packet from a first endpoint of a first segment group having a first plurality of Peripheral Component Interconnect Express (PCIe)-based buses to a second endpoint of a second segment group having a second plurality of PCIe-based buses; and using an internal bridge to route said ID-routed packet from said first segment group to said second segment group, wherein to route said ID-routed packet includes to render a multi-segmented protocol of the internal bridge transparent to a requesting endpoint by adjusting an identifier of said internal bridge based on a direct connection to said second segment group via said internal bridge and exclusive of an indirect connection to said second segment group via a separate bridge.

21. The method of claim 20, further comprising:
comparing a target endpoint ID provided as part of said ID-routed packet with a list of a plurality target endpoint IDs in a segment-based routing table.

22. The method of claim 21, further comprising:
routing said ID-routed packet to said second segment group using said segment-based routing table.

23. The method of claim 20, wherein said internal bridge replaces a source physical address in said ID-routed packet with a physical address of the internal bridge in order to enable messages to be routed back to an originator.

24. The method of claim 20, wherein a target endpoint access physical address of a list of a plurality of target endpoint access physical addresses includes a segment ID, a bus ID, a device ID, and a function ID, the segment ID being used in conjunction with the bus ID, the device ID, and the function ID to route said ID-routed packet to said second segment group.

25. The method of claim 20, wherein said internal bridge is configured to operate using a Management Component Transport Protocol (MCTP)-over-Peripheral Component Interconnect Express (PCIe) protocol.

* * * * *